United States Patent [19]

Markarian

[11] 4,408,818
[45] Oct. 11, 1983

[54] CAPACITOR COVER-TERMINAL ASSEMBLY

[75] Inventor: Paul M. Markarian, North Adams, Mass.

[73] Assignee: Sprague Electric Company, North Adams, Mass.

[21] Appl. No.: 238,314

[22] Filed: Feb. 26, 1981

[51] Int. Cl.³ .............................................. H01R 3/00
[52] U.S. Cl. ............................ 339/147 C; 339/218 C; 361/272; 361/328
[58] Field of Search ............... 361/272, 306, 433, 271, 361/328; 339/147 C, 218 C, 220 C, 221 R

[56] References Cited

U.S. PATENT DOCUMENTS

| | | | |
|---|---|---|---|
| 1,789,949 | 1/1931 | Georgiev . | |
| 2,050,062 | 8/1936 | Mershon | 175/315 |
| 2,569,925 | 10/1951 | Deeley | 339/220 C X |
| 2,948,770 | 8/1960 | Ruscito et al. | 174/52 |
| 3,015,687 | 1/1962 | Ruscito | 174/153 |
| 3,252,065 | 5/1966 | Warner et al. | 361/272 X |
| 3,304,473 | 2/1967 | Netherwood et al. | 361/272 |
| 3,866,095 | 2/1975 | Marmorek | 361/433 |
| 4,298,906 | 11/1981 | Elias | 361/433 |

Primary Examiner—Mark Rosenbaum

[57] ABSTRACT

A terminal-cover assembly for a multisection capacitor has three terminal-bushing assemblies mounted in a round metal cover so as to meet the minimum spacing requirements between terminals and between the terminals and the edge of the cover. The terminal-bushing assemblies are mounted in the cover in a triangular array, and the bushings have an irregular pentagonal shape. A four-bladed terminal in the shape of an irregular octagon is provided for the assembly.

7 Claims, 2 Drawing Figures

CAPACITOR COVER-TERMINAL ASSEMBLY

BACKGROUND OF THE INVENTION

This invention relates to a terminal-cover assembly for a multisection round capacitor, and more particularly to such an assembly that exceeds the minimum spacing requirements for terminal-terminal distance and terminal-rim distance. The invention also relates to a four-bladed terminal for the assembly that meets the spacing requirements even for small capacitor sizes.

Multisection capacitors are often used for AC motor-start and motor-run service. Frequently, they have a common electrode, thus requiring only three terminals. When three terminal units are housed in oval containers, the terminals can be mounted in the cover in a line and still meet customer and Underwriters Laboratory (UL) requirements for terminal spacing.

The UL spacing requirements are that there must be at least 0.125 inch (3.18 mm) between terminals and between terminals and the rim of the can or housing for 0–300 V service. When terminals are of opposite polarity, then the above spacing must be 0.25 inch (6.35 mm). For 301–600 V service, this minimum spacing becomes 0.375 inch (9.525 mm).

When three terminal capacitor units are housed in round containers, which provide greater volumetric efficiency, the terminals cannot be mounted in a line and still meet the foregoing minimum spacing requirements. Generally three terminals are mounted in the cover of round containers in a triangular array. For cover sizes of three inch diameter or less using standard terminals in standard bushings, there is even a problem in using multiple blade terminals and still meeting the minimum requirements for distance between terminals and distance between terminals and edge of the housing.

SUMMARY OF THE INVENTION

This invention features a novel round cover for AC multisection capacitors having three terminals mounted therein that meets the minimum spacing requirements between terminals and between the terminals and the edge of the unit. The invention also features a novel four-bladed terminal that meets these requirements and has standard size flat blades so that standard connectors, particularly quick connect clips, may be used with it.

It is possible to use standard two- and three-bladed terminals of the prior art in covers of three-inch diameter or less while meeting all the above minimum spacing requirements. However, it is not possible to use standard prior art four-bladed terminals in such covers and still meet the largest UL "between terminal" spacing requirement, the 0.375 inch (9.525 mm) spacing. With a two-inch diameter cover and standard four-bladed terminals, it is also not possible to meet the 0.375 inch (9.525 mm) "terminal to edge of can" spacing requirement. This "terminal to edge of can" spacing is measured from the terminal to the vertical plane in which the edge of the cover lies. The present invention features both a novel bushing and a novel four-bladed terminal that overcomes these deficiencies, even when used with a two-inch cover.

The terminal cup or bushing of this invention is in the shape of a pentagon with one curved edge that lies on an imaginary circle concentric with the cover. The apex opposite the curved edge of each cup points to the center of the cover, and the two other sides are parallel and substantially perpendicular to the curved edge. They allow for the correct location of the conventional fill-hole that is required in the cover. This cup or bushing is made of an insulating material, preferably a thermoset or thermoplastic material. The design of the bushing is such that the leakage path along the surface of the bushing between any terminal blade and the cover surface is at least 0.5 inch (12.7 mm).

When two- or three-bladed terminals are required, stock terminals may be used within the bushing of this invention. The four-bladed terminal of this invention also fits within the bushing of this invention and meets the minimum spacing requirements. This is accomplished by changing the shape of the terminal base from which the blades extend from rectangular to an irregular octagon. The blades are flat and are at an angle to each other. When mounted in the bushing, one blade parallels one of the sides of the bushing forming the center apex; a second blade parallels the second of such sides. The remaining two blades each approximately parallel a portion of the curved side of the bushing.

DESCRIPTION OF THE PREFERRED EMBODIMENTS

Figure 1:
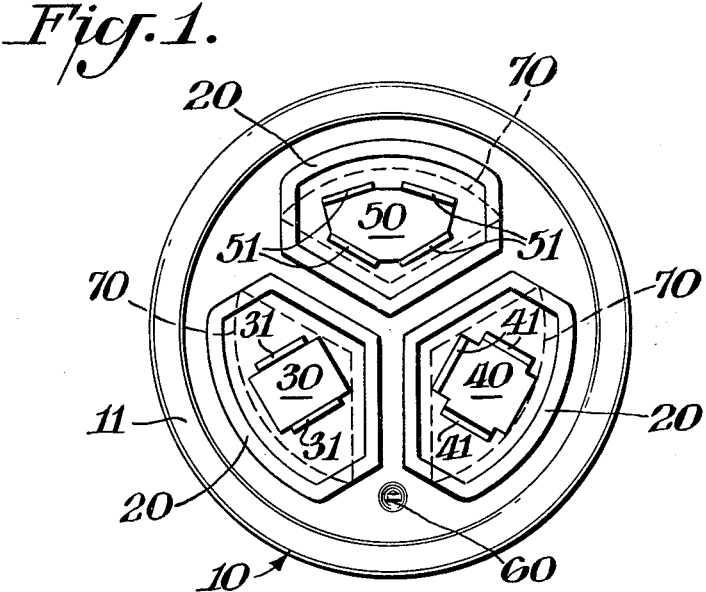
FIG. 1 is a top view of the cover-terminal assembly of the present invention.

A round metal cover 10 with raised rim 11 has three bushings 20 mounted therein. Each bushing 20 contains one terminal 30 or 40 or 50. In FIG. 1, terminal 30 is a standard terminal with two blades 31, terminal 40 is a standard terminal with three blades 41, and terminal 50 is the terminal of the present invention with four flat blades 51. The terminals may be utilized as shown, or all terminals may be of the same type, or any combination desired. Three different terminals are shown to illustrate their fit within the safety zone indicated by dashed line 70, thereby ensuring that the most stringent spacing requirement will be met. That is, any blade of each terminal will be at least 0.375 inch (9.525 mm) from any blade of any other terminal and all blades will be 0.375 inch (9.525 mm) from the vertical place in which the edge of cover 10 lies.

Fill hole 60 is provided to permit the addition of electrolyte or dielectric fluid after cover 10 has been sealed to a housing. Fill hole 60 is preferably located opposite the common terminal so as to serve also as a reference point to it.

Bushing 20 is a pentagon with one curved edge. This curved edge lies on an imaginary circle concentric with the cover and of smaller radius than the cover. The bushing 20 has two short sides parallel to each other and approximately perpendicular to the curved side. The remaining two sides meet in an apex that points to the center of the cover and is opposite the curved edge. The five sides form the walls of the bushing cup and enclose a flat horizontal portion having a hole therethrough with a sleeve depending from the hole. The terminal is mounted in the hole so that a shank portion of the terminal extends through the sleeve and the cover for attachment to an electrode tab. The assembly of the terminals and associated bushings is well-known in the art and is described, for example, by Ruscito in U.S. Pat. No. 3,015,687, issued Jan. 2, 1962.

Terminal 50 has a base portion in the shapes of an irregular octagon with four flat blades 51 at an angle to each other extending vertically from four non-adjacent sides. Two of these non-adjacent sides parallel two sides of the pentagonal bushing 20 that form its center apex. These blades are set at a 30° angle from the edge joining these two blades. Two other of the non-adjacent sides are each approximately parallel the curved edge of bushing 20. These blades are set at an angle of 16.5° from the edge joining these two blades. Blades 51 themselves are standard blades so that stock connectors may be used with the final capacitor.

The octagonal shape of terminal 50 ensures that each of the blades 51 is at least 0.375 inch (9.525 mm) away from the nearest blade of an adjacent terminal even when all terminals are of the design of terminal 50. The shape also ensures that all blades are at least 0.375 inch (9.525 mm) from the vertical plane that includes the edge of the cover.

Figure 2:
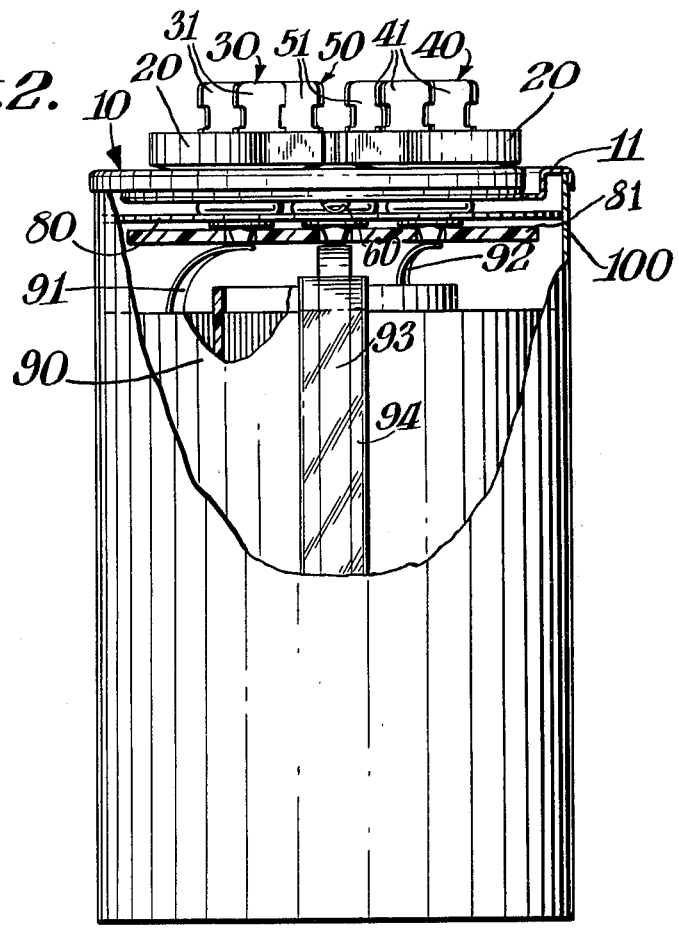
FIG. 2 is a cut-away view of the capacitor showing the connections of the capacitor section to the cover-terminal assembly.

FIG. 2 shows a cross-section of an assembled capacitor in which section 90 is a concentric dual convolutely-wound capacitor section, preferably of the metallized film type, with two leads 91 and 92 extending from one end of the section and another lead 93, common to both sections, extending from the other end and encased in an insulating sleeve 94. Leads 91, 92, and 93 are electrically connected to the bottoms of terminals 30, 40, and 50, respectively, where they extend through interrupter 81. Cover 10 is sealed to can 100 around rim 11.

Interrupter 81 is round with three holes in it corresponding to the spacing of the terminals. The side facing the cover is flanged about the rim, obviating the need for a spacer. The other side of the interrupter is ribbed in a snowflake pattern to provide added strength to the disc. It is preferably made of a material that does not contaminate the dielectric fluid during the operating life of the capacitor, such as polyphenylene sulfide.

The cover-terminal assembly is particularly useful with dual capacitors in the form of two wound capacitor sections so connected as to have a common electrode tab or a single wound dual section having a common electrode.

The bushings could be molded in a one-piece design with three recesses or cups as described above, but it is preferred to use separate parts so they may be used with any size cover and at different spacing. Also, with present interrupter systems, the separate bushings will tilt away from each other should the cover bulge while a one-piece bushing unit might impede the action of the interrupter when the capacitor is at the point of failure.

Preferably, the bushings and associated terminals are located at the same spacing regardless of cover size and that spacing is the one that is the most difficult to meet, the 0.375 inch (9.525 mm) spacing, to cut down on parts inventory. By using the same spacing, parts such as insulator 80 and interrupter 81 may be standardized also.

What is claimed is:

1. A cover-terminal assembly for a multi-section capacitor comprising a round metal cover having a rim portion and three terminals mounted therein in a triangular array, each of said terminals having a plurality of flat blade portions and being located in an insulative bushing having a pentagonal shape, there being at least minimum safety distance between any blade portion of any one of said terminals and any blade portion of any other of said terminals and between any blade portion of any of said terminals and a vertical plane in which an edge of said cover lies, wherein each of said bushings has a curved edge that lies on an imaginary circle concentric with and smaller than the cover, two straight edges that form an apex pointing to the center of said cover and lying opposite said curved edge, and two straight edges parallel to each other and each joining an edge that forms said apex and said curved edge.

2. A cover-terminal assembly according to claim 1 wherein said curved edge and said straight edges define vertical sides of said bushing and enclose a flat irregular pentagonal recess in which said terminal is located, said flat surface having a passage extending downward from said flat surface through the bottom of said bushing to receive the shank portion of said terminal.

3. A cover-terminal assembly according to claim 1 wherein said flat bladed terminal is a four-bladed terminal.

4. A cover-terminal assembly according to claim 3 wherein said four-bladed terminal has a shank portion depending from a flat surface having the shape of an irregular octagon, and four flat blades extending vertically and perpendicularly from four non-adjacent edges of said octagon, said blades being set at an angle to each other, two of said blades being set at 30° to the edge of the octagon between them, the other two of said blades being set at 16.5° to the edge of the octagon between them.

5. A cover-terminal assembly according to claim 4 wherein said four-bladed octagonal terminal is mounted in said pentagonal bushing recess so that said blades set at 30° parallel said sides forming said apex opposite said curved side and said blades set at 16.5° essentially parallel portions of the arc of said curved side, and said shank portion extends through said passage.

6. A cover-terminal assembly according to claim 1 wherein there is at least 0.5 inch path along the surface of the bushing between any blade of said terminals and any portion of said cover.

7. A cover-terminal assembly according to claim 1 wherein said minimum safety distance is 0.375 inch.

* * * * *